P. H. GEIGER

Aug. 5, 1930. RAILWAY TRAFFIC CONTROLLING APPARATUS Re. 17,763

Original Filed Oct. 29, 1923 2 Sheets-Sheet 1

INVENTOR:
P. H. Geiger,
by A. R. Vernell
His Attorney

Aug. 5, 1930. P. H. GEIGER Re. 17,763

RAILWAY TRAFFIC CONTROLLING APPARATUS

Original Filed Oct. 29, 1923 2 Sheets-Sheet 2

INVENTOR:
P. H. Geiger,
by A. R. Vernell
His Attorney

Reissued Aug. 5, 1930 Re. 17,763

UNITED STATES PATENT OFFICE

PAUL H. GEIGER, OF ANN ARBOR, MICHIGAN, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Original application filed October 29, 1923, Serial No. 671,368. Divided and application filed March 10, 1928, Serial No. 260,682. Original No. 1,704,735, dated March 12, 1929. Application for reissue filed June 9, 1930. Serial No. 460,068.

My invention relates to railway traffic controlling apparatus, and particularly to apparatus of the type comprising devices located along the trackway and controlled in accordance with traffic conditions for governing the passage of trains.

The present case is a division of my copending application, Serial No. 671,368, filed October 29, 1923, for railway traffic controlling apparatus and electrical apparatus suitable for use therein which has matured into Patent No. 1,704,736, March 12, 1929.

I will describe several forms of apparatus embodying my invention, and will then point out the novel features thereof in claims.

Figure 2:
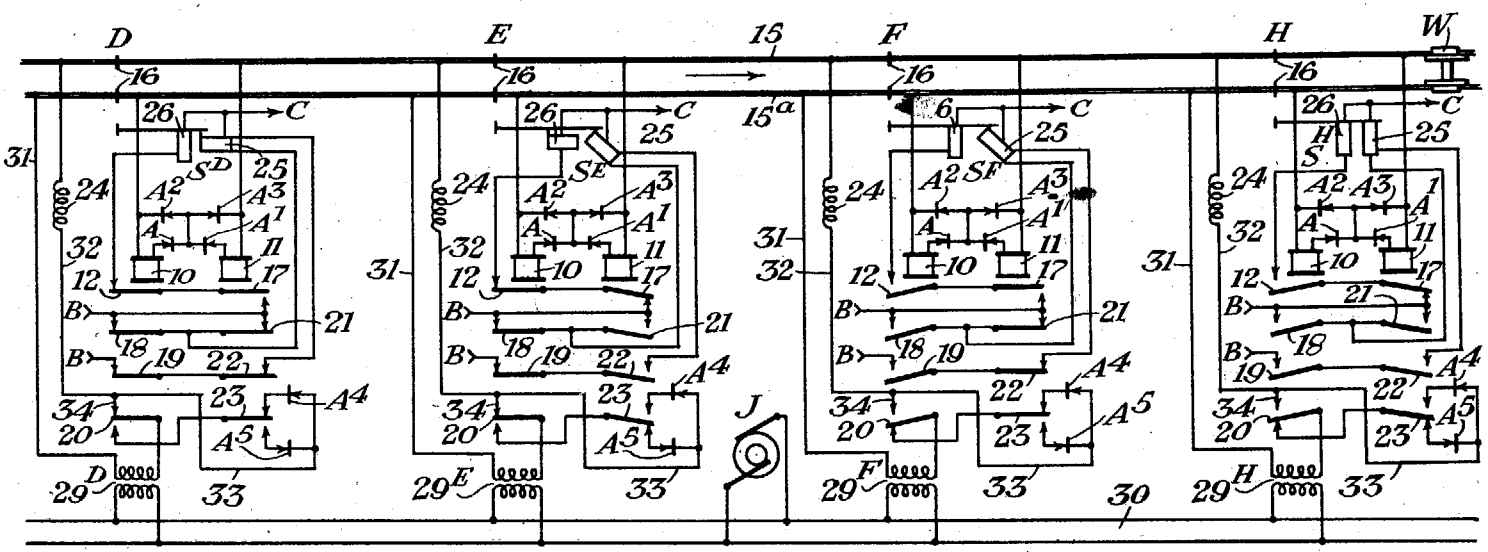
Figure 1:
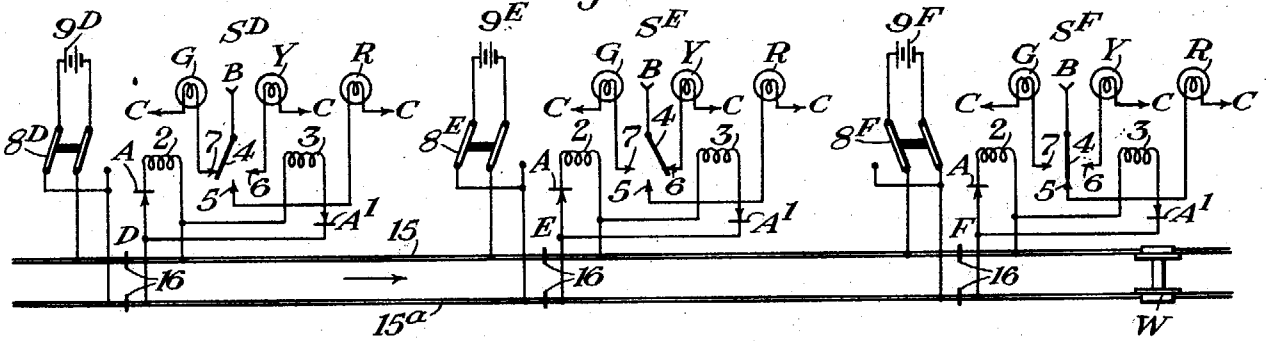
Figure 3:
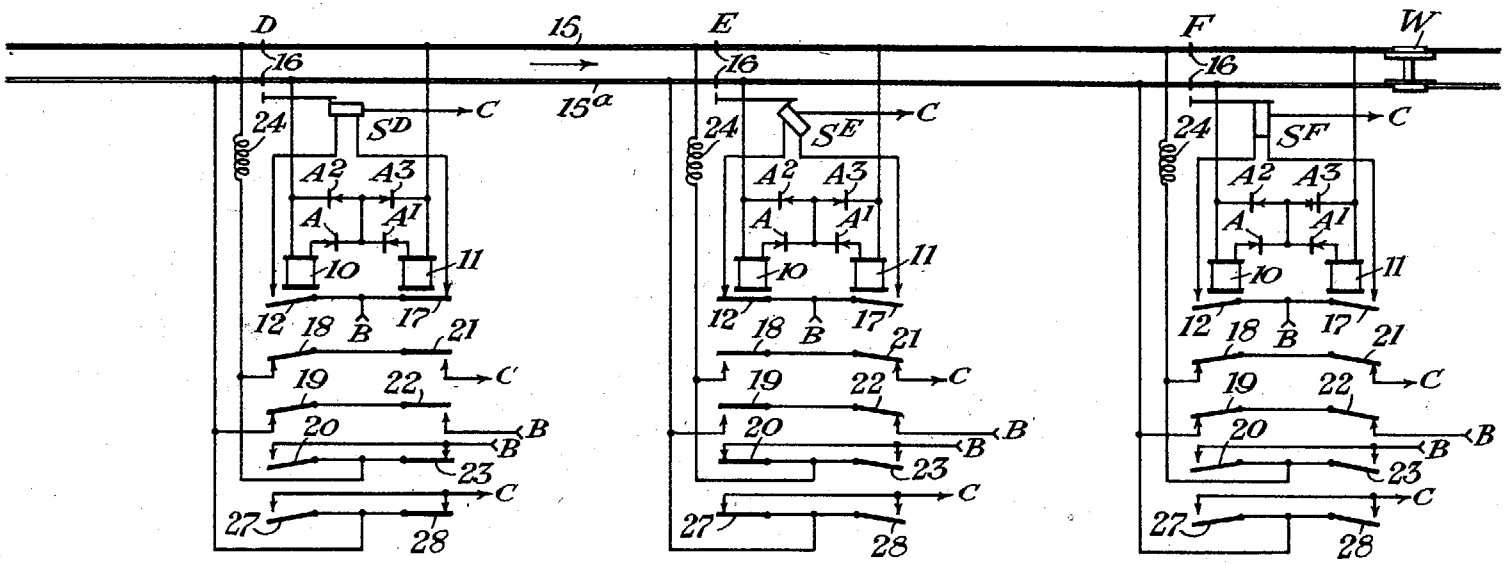

In the accompanying drawings, Fig. 1 is a view showing one form of railway traffic controlling apparatus embodying my invention. Figs. 2 and 3 are views showing modified forms of the apparatus illustrated in Fig. 1 and also embodying my invention.

Similar reference characters refer to similar parts in each of the three views.

Referring first to Fig. 1, the reference characters 15 and 15[a] designate the track rails of a railway over which traffic normally moves in the direction indicated by the arrow. These rails are divided, by means of insulated joints 16, into a plurality of successive track sections D—E, E—F, etc. Located adjacent the entrance end of each section is a pair of windings 2 and 3 connected in multiple across the rails of the section. Associated with winding 2 is a device A which constitutes means for permitting current flowing in one direction but not in the other to pass through the winding 2. This device A is a unidirectional current carrying device or asymmetric unit of any suitable type, the direction of high conductivity of the device A being indicated by the arrow. A similar asymmetric unit $A^1$ is associated with the winding 3. As here shown, each of these units A and $A^1$ is connected in series with the associated winding, and the units are so arranged that current flowing in one direction is permitted to flow freely through winding 2 but not through winding 3, whereas, current flowing in the other direction is permitted to flow through winding 3 but not winding 2.

Interposed between the windings 2 and 3 and controlled thereby is an armature 4 cooperating with three fixed contacts 5, 6 and 7. When both windings 2 and 3 are deenergized or are both equally energized, armature 4 occupies its intermediate position, wherein contact 4—5 is closed. When winding 3 is energized and winding 2 is deenergized or is energized less strongly than winding 3, armature 4 is swung to the right so that contact 4—6 is closed. When, however, winding 2 is energized and winding 3 is deenergized or is energized less strongly than winding 2, the armature 4 is swung to the left so that contact 4—7 becomes closed.

Current is reversibly supplied to the rails of each section adjacent the exit end of the section by means of a battery designated by the reference character 9 with a suitable exponent, and a pole changer designated by the reference character 8 with a suitable exponent, which pole changer may be operated by any suitable means not shown in the drawing. In order to simplify the description of the apparatus, I will term the windings 2 and 3, the associated asymmetric units A and $A^1$, and the armature 4, a relay device. Each relay device controls a signal designated in general by the reference character S with an exponent corresponding to the location and each of which signals in the form here shown comprises three electric lamps G, Y and R. These lamps are arranged to project beams of green, yellow and red light, respectively, and when lighted they indicate respectively, proceed, caution, and stop. The proceed lamp G is provided with a circuit which passes from terminal B of a suitable source of current, through contact 4—7 of the associated relay device to terminal C of the same source of current. Caution lamp Y is similarly controlled by contact 4—6, and the stop lamp R is similarly controlled by contact 4—5 of the associated relay device.

As shown in the drawing, the section immediately to the right of point F is occupied by a train W, so that both of the windings 2 and 3 of the relay device at point F are deenergized. Contact 4—5 being closed, signal $S^F$ indicates stop. Pole changer $8^F$ is in such position that the upper rail in section E—F is positive, so that winding 3 of the relay device at point E is energized. Contact 4—6 of this device is accordingly closed, so that signal $S^E$ indicates caution. Pole changer $8^E$ is in such position that the lower rail $15^a$ of section D—E is positive, whereby winding 2 of the relay device at point D is energized and winding 3 of this device is deenergized. Contact 4—7 of this relay device is accordingly closed, so that signal $S^D$ indicates proceed. When the train W passes out of the section immediately to the right of point F, signal $S^F$ will change to the caution indication and pole changer $S^F$ will then be reversed, so that signal $S^E$ will change to the proceed indication.

Referring now to Fig. 2, I have shown a four-indication signaling system in which each section is provided with two track relays 10 and 11 connected in series across the track rails adjacent the entrance end of the section. Each relay 10 is provided with a shunt including an asymmetric unit $A^2$, whereas, each relay 11 is provided with a shunt including an asymmetric unit $A^3$. The units $A^2$ and $A^3$ are oppositely disposed, so that current of one polarity but not the other is forced to flow through relay 10, whereas, current of the second polarity but not the first is forced to flow through relay 11. In the arrangement shown in the drawing, relay 10 is provided with an additional asymmetric unit A which freely passes the current which is forced by unit $A^2$ to flow through relay 10, but opposes the passage of the flow of current of the other polarity in relay 10. Relay 11 is similarly provided with an additional unit $A^1$ which freely passes current that is forced by unit $A^3$ to flow through the relay 11, but opposes the passage of current of the other polarity.

Each of the signals in the arrangement here shown is of the two-arm semaphore type, and each signal is controlled by the associated relays 10 and 11 in the following manner: When both relays are deenergized (see signal $S^H$) both semaphore arms 25 and 26 are in the horizontal position indicating "stop." When relay 11 is energized and relay 10 is deenergized, (see signal $S^F$), a caution indication circuit is closed for semaphore arm 25, which circuit passes from terminal B of a suitable source of current not shown in the drawing, through contact 21 of relay 11 and operating mechanism of semaphore 25 to terminal C of the same source of current. The signal then indicates "proceed prepared to stop at next signal." When relay 10 is energized and relay 11 deenergized (see signal $S^E$), the caution indication circuit for semaphore arm 25 passes from terminal B, through contact 18 of relay 10, and the semaphore arm operating mechanism to terminal C. A circuit for semaphore arm 26 is also closed, which circuit passes from terminal B, through back contact 17 of relay 11, front contact 12 of relay 10 and the operating mechanism of arm 26 to terminal C. The signal then indicates "proceed with caution." When both relays 10 and 11 are energized (see signal $S^D$) the circuit for semaphore arm 26 is open at back contact 17 of relay 11 but the caution circuit for semaphore arm 25 is still closed at contact 18 of relay 10. A proceed circuit for arm 25 is also closed, which circuit passes from terminal B through front contact 19 of relay 10, front contact 22 of relay 11, and the operating mechanism of arm 25 to terminal C. Semaphore arm 25 is then in vertical position so that the signal indicates "proceed."

As shown in the drawing, the section immediately to the right of point H is occupied by a train W, so that both relays 10 and 11 at point H are deenergized, with the result that signal $S^H$ indicates stop. Current is now supplied to the rails of section F—H from the secondary of the transformer $29^H$, the primary of which is constantly supplied with alternating signaling current from a generator J through the medium of a transmission line 30. The circuit for section F—H is from the left-hand terminal of the secondary of transformer $29^H$, through wire 31, the rail $15^a$, and from rail 15, through reactance 24, wires 32 and 33, asymmetric unit $A^5$, back point of contact 23 of relay 11 and back point of contact 20 of relay 10 to the right-hand terminal of the secondary of transformer $29^H$. Asymmetric unit $A^5$ is so connected in this circuit that current can flow from the right-hand terminal of the transformer secondary to the left-hand terminal but not in the other direction, and, consequently, relay 11 at point F is energized and relay 10 at the same point is deenergized. The circuit for supplying current to the rails of section E—F is the same as the circuit for section F—H, except that the current for section E—F passes through asymmetric unit $A^4$ and the front point of contact 23, instead of through unit $A^5$ and the back point of contact 23. Consequently, at point F the current can flow from the left-hand terminal of the secondary of transformer $29^F$ to the right-hand terminal but not in the other direction. The result of this is that at point E relay 10 is energized and relay 11 is deenergized. The circuit for supplying current to the rails of section D—E passes from the secondary of transformer $29^E$, through wire 31, the rail $15^a$, and from rail 15 through reactance 24, wires 32 and 34, and the front point of contact 20 of relay 10 to the secondary of transformer $29^E$. It follows that alternating current is supplied to the rails of section D—E so that both relays 10 and 11 are energized. Alternating current will accordingly be supplied to the section to the left of point D because relay 10 at point D is energized.

When the train W passes out of the section to the right of point H, relay 11 at point H will become energized, so that at point F, relay 11 will become deenergized and relay 10 will become energized. Both relays 10 and 11 at point E will then become energized, so that signal $S^E$ will then give a proceed indication.

Referring now to Fig. 3, the apparatus here shown is similar to that shown in Fig. 2, except that the signaling system is of the three-indication type. That is to say, each signal S is adapted to indicate "stop," "caution" and "proceed", and, as here shown, each of these signals is of the one-arm semaphore type. Each signal is provided with a caution indication circuit including front contact 12 of the associated relay 10, and with a proceed indication circuit including front contact 17 of the associated relay 11. It follows that each signal will indicate caution when relay 10 is energized, proceed when relay 11 is energized, and stop when both of these relays are deenergized.

As shown in the drawing, the section immediately to the right of point F is occupied by a train W, so that both relays 10 and 11 at point F are deenergized, with the result that signal $S^F$ indicates stop. The rails of section E—F are now supplied with current which passes from terminal B of a suitable source, through back contact 22 of relay 11, back contact 19 of relay 10 to lower rail $15^a$, and from upper rail 15, through back contact 18 of relay 10, and back contact 21 of relay 11 to terminal C of the same source. This current is in such direction as to energize relay 10 at point E but not relay 11 at the same point. Signal $S^E$ accordingly indicates caution, and current is supplied to the rails of section D—E from terminal B, through front contact 20 of relay 10 to the upper rail 15, and from the lower rail $15^a$ through front contact 27 of relay 10 to terminal C of the same source. This current flows in such direction that at point D relay 11 is energized and relay 10 is deenergized. Signal $S^D$ accordingly indicates proceed, and the supply of current to the rails of the section to the left of point D is as follows: From terminal B, through front contact 23 of relay 11 to rail 15, and from rail $15^a$, through front contact 28 of relay 11 to terminal C. This current flows in the same direction as that supplied to section D—E, so that at the next point to the left of point D relay 11 will be energized and relay 10 deenergized.

Although I have herein shown and described only a few forms of railway traffic controlling apparatus embodying my invention, it is understood that various changes and modifications may be made therein within the scope of the appended claims without departing from the spirit and scope of my invention.

Having thus described my invention, what I claim is:

1. In combination, a section of railway track, means for reversibly supplying current to the rails of the section, two windings connected with the rails of the section, asymmetric units associated with said windings for permitting current of one polarity but not of the other to pass through one winding and for permitting current of the second polarity but not of the first to pass through the other winding, and a trackway signal controlled jointly by said windings.

2. In combination, a section of railway track, means controlled by traffic conditions ahead of said section for reversibly supplying current to the rails of the section, two relays connected with the rails of said section, asymmetric units associated with said relays for permitting current of one polarity but not of the other to pass through one relay and for permitting current of the second polarity but not of the first to pass through the other relay, and traffic governing means for said section controlled by said relays.

3. In combination, a section of railway track, two relays connected with the rails of said section, asymmetric units associated with said relays for permitting current of one polarity but not of the other to pass through one relay and for permitting current of the second polarity but not of the first to pass through the other relay, traffic governing means controlled by said relays, and means for reversibly supplying current to the rails of said section.

4. In combination, a section of railway track, two windings connected with the rails of said section, asymmetric units associated with said windings for permitting current of one polarity but not of the other to pass through one winding and for permitting current of the second polarity but not of the first to pass through the other winding, traffic governing means controlled by said windings, and means for reversibly supplying current to the rails of said section.

5. In combination, a section of railway track, two relays connected with the rails of said section, asymmetric units associated with said relays for permitting current of one polarity but not of the other to pass through one relay and for permitting current of the second polarity but not of the first to pass through the other relay, traffic governing means controlled by said relays, and means for supplying current of one polarity or current of the other polarity or alternating current to the rails of said section.

6. In combination, a plurality of successive sections of railway track, two relays connected with the rails of each section, asymmetric units associated with the relays for each section for permitting current of one polarity but not of the other to pass through one relay and for permitting current of the second polarity but not of the first to pass through the other relay, whereby one relay or the other is energized according as the section is supplied with current of one polarity or the other and both relays are energized when the section is supplied with alternating current, traffic governing means controlled by said relays, and means controlled by the relays of each section for supplying the section in the rear with current of one polarity of current of the other polarity or alternating current according as both relays are deenergized or one relay is energized or the other relay is energized.

7. In combination, a plurality of successive sections of railway track, two relays connected with the rails of each section, asymmetric units associated with the relays for each section for permitting current of one polarity but not of the other to pass through one relay and for permitting current of the second polarity but not of the first to pass through the other relay, whereby one relay or the other is energized according as the section is supplied with current of one polarity or the other and both relays are energized when the section is supplied with alternating current, traffic governing means controlled by said relays, a source of alternating current for each section, means operating when one relay of a section is energized to connect the source for the section in the rear directly with the rails, and means operating when said one relay is deenergized to connect said source with the rails through one asymmetric unit or another according as the other relay is energized or deenergized, said last mentioned units being arranged to pass currents of opposite polarities.

8. In combination, a plurality of successive sections of railway track, two relays connected with the rails of each section, asymmetric units associated with the relays for each section for permitting current of one polarity but not of the other to pass through one relay and for permitting current of the second polarity but not of the first to pass through the other relay, traffic governing means controlled by said relays, and means controlled by the relays of each section for reversibly supplying current to the rails of the section next in rear.

9. In combination, a plurality of successive sections of railway track, two windings receiving current from the rails of each section, means associated with one winding of each section for permitting current flowing in one direction but not in the other to pass through the winding, means associated with the other winding of each section for permitting current flowing in the said other direction but not in the first direction to pass through the winding, traffic governing means controlled by said windings, means for supplying current to the rails of each section, and means controlled by the windings of each section for determining the direction of the flow of current in the rails of the section next in the rear.

10. In combination, a plurality of successive sections of railway track, two relays receiving current from the rails of each section, means associated with one relay of each section for permitting current flowing in one direction but not in the other to pass through the relay, means associated with the other relay of each section for permitting current flowing in the said other direction but not in the first direction to pass through the relay, traffic governing means controlled by said relays, means for supplying current to the rails of each section, and means controlled by the relays of each section for determining the direction of the flow of current in the rails of the section next in the rear.

11. In combination, a section of railway track, a source of alternating current connected with the rails of said section, two relays connected with the rails of said section, asymmetrical units associated with said relays for permitting current of one polarity but not of the other to pass through one relay and for permitting current of the other polarity but not of the first polarity to pass through the other relay, traffic governing means for said section, and means for operating said traffic governing means only when said relays are both energized.

12. In combination, a section of railway track, a source of alternating current connected with the rails of said section, two relays connected with the rails of said section, asymmetrical units associated with said relays for permitting current of one polarity but not of the other to pass through one relay and for permitting current of the other polarity but not of the first polarity to pass through the other relay, a traffic governing device capable of assuming a more restrictive or a less restrictive condition, and means for causing said device to assume its less restrictive condition and when and only when said two relays are both energized.

13. A railway signaling track circuit comprising a source of direct current and a track relay each connected across the rails, and a copper oxide rectifier so connected between said relay and one track rail that the track circuit current flows therethrough in the low resistance direction.

14. A railway signaling track circuit comprising a source of direct current and a track relay each connected across the rails, and a device interposed between said relay and one track rail and having the characteristic of instantaneously increasing in resistance in response to decrease of the current flowing therethrough.

15. A railway signaling track circuit comprising a source of direct current and a track relay each connected across the rails, and a copper oxide rectifier so connected in series with said relay that the track circuit current flows therethrough in the low resistance direction.

In testimony whereof I affix my signature.

PAUL H. GEIGER.